US012633439B2

(12) United States Patent
Fu

(10) Patent No.: US 12,633,439 B2
(45) Date of Patent: May 19, 2026

(54) MAGNETIC FIELD GUIDE DEVICE AND METHOD FOR CHANGING MAGNETIC FIELD STATE OF TARGET OBJECT

(71) Applicant: Beijing Wanhua Technology Co., Ltd., Beijing (CN)

(72) Inventor: Wenjun Fu, Beijing (CN)

( * ) Notice: Subject to any disclaimer, the term of this patent is extended or adjusted under 35 U.S.C. 154(b) by 258 days.

(21) Appl. No.: 18/033,782

(22) PCT Filed: Oct. 20, 2021

(86) PCT No.: PCT/CN2021/124965
§ 371 (c)(1),
(2) Date: Apr. 25, 2023

(87) PCT Pub. No.: WO2022/089275
PCT Pub. Date: May 5, 2022

(65) Prior Publication Data
US 2023/0402215 A1 Dec. 14, 2023

(30) Foreign Application Priority Data
Oct. 27, 2020 (CN) ......................... 202011161258.1

(51) Int. Cl.
*H01F 7/20* (2006.01)

(52) U.S. Cl.
CPC ..................................... *H01F 7/20* (2013.01)

(58) Field of Classification Search
CPC .. H01F 7/20; H01F 7/064; A61N 1/16; A61H 39/002; A61H 2201/165; A61H 39/086
See application file for complete search history.

(56) References Cited

U.S. PATENT DOCUMENTS

2008/0042785 A1* 2/2008 Yagisawa .............. H01P 1/2007 333/245
2012/0188043 A1* 7/2012 Saito ......................... H01F 5/00 336/200
2020/0101307 A1* 4/2020 Marcantonio .......... A61H 39/08

FOREIGN PATENT DOCUMENTS

CN 210745638 U * 6/2020
GB 1407151 A * 9/1975 ............. H01Q 15/00
JP 2004172517 A * 6/2004
JP 2004193886 A * 7/2004
JP 4159346 B2 * 10/2008
(Continued)

*Primary Examiner* — Mohamad A Musleh
(74) *Attorney, Agent, or Firm* — EDISON LAW GROUP, PLLC

(57) ABSTRACT

Disclosed is a magnetic field guide device comprising a wedge-shaped magnetic field guide head whose border gradually converges along a specific direction. During use, the device is in proximity or connected to a target object requiring change in a magnetic field state, thus achieving the effect of guiding the magnetic field of the target object along a direction from a convergence end to a diffusion end of the device. Further disclosed is a method for changing a magnetic field state of a target object, i.e., multiple magnetic field guide devices are in proximity or integrally connected to a target object requiring change in a magnetic field state. As such, a strong effect of converging a stray magnetic field of the target object is achieved, and even a focused magnetic field or a collective magnetic field is formed to increase the possibility of effective use of an ordered magnetic field.

8 Claims, 11 Drawing Sheets

(56) References Cited

FOREIGN PATENT DOCUMENTS

| | | | | | |
|---|---|---|---|---|---|
| JP | 4498258 | B2 * | 7/2010 | ............... | H01F 5/00 |
| WO | WO-2015096571 | A1 * | 7/2015 | ............... | A61N 2/02 |

* cited by examiner

MAGNETIC FIELD GUIDE DEVICE AND METHOD FOR CHANGING MAGNETIC FIELD STATE OF TARGET OBJECT

TECHNICAL FIELD

The present disclosure relates to methods and devices for changing magnetic field states of target objects, and in particular to a device capable of guiding a magnetic field and a biological field along a specific direction, and a method for changing a magnetic field state of a target object.

BACKGROUND

Magnetic fields are ubiquitous in the real world, ranging from the Earth and stars to the directional motion of charges, all of which can generate magnetic fields. In the human body, complex biological fields are generated in tissues and organs due to bioelectric activities.

The biological fields have many characteristics: for example, magnetism generates electricity, that is, the motion of a conductor cutting magnetic induction lines in a magnetic field can generate a current; and electricity generates magnetism, that is, a circular magnetic field is generated around an energized conductor, and when a current in the conductor is stronger, the generated magnetic field is stronger.

The magnetic field is directional. As can be seen from the direction of a magnetic field around a permanent magnet and the directional feature of the geomagnetic field, the magnetic field density at both poles of the magnet or the Earth is maximum, while the magnetic field density around the middle of the magnet or near the equator is small. Thus, both of the magnetic fields present a diffuse shape ranging from density to sparsity between two points and the directional feature. Moreover, the entire trajectory of each planet orbiting the sun and following the sun in the Milky Way galaxy presents a conical spiral motion trajectory, which presents a wedge shape when being seen from a planar perspective, perhaps the secrets of the essential characteristics of the universe are hidden therein. In the prior art, there is no application of using such diffuse shape and directional feature of the magnetic field as well as the conical spiral feature to change a spatiotemporal field state of an object. In view of this, the inventor proposed a method for changing a magnetic field state of a target object by combining the magnetic field characteristic and the planetary conical spiral trajectory and invented a magnetic field guide device, which is practical and applicable in changing a magnetic field, an electric field, a biological field, and other characteristic fields of an object.

SUMMARY

In view of the defects of the prior art, the technical problem to be solved by the present disclosure is to provide a magnetic field guide device. After provision of the device, a magnetic field around a position where the device is provided can be guided along a specific direction, thus implementing innovative applications in changing magnetic fields of various materials and adjusting directions of biological fields.

Upon consideration of changing a spatiotemporal field of an object in a plurality of fields by combining a density difference characteristic of spatial magnetic field distribution around a magnet and a shape of a planetary conical spiral trajectory, in order to put them into application and practice, the present disclosure provides a magnetic field guide device and a method for changing a magnetic field state of a target object.

The magnetic field guide device involved in the present disclosure includes a wedge-shaped magnetic field guide head, wherein the border of the magnetic field guide head gradually converges along a specific direction.

The material of the magnetic field guide head is a conductor; the magnetic field guide head includes a plurality of communicating portions and a plurality of interfering portions; and the interfering portions are each connected to the respective adjacent communicating portion sequentially along a communicating direction, and the borders of the plurality of interfering portions gradually converge along the communicating direction.

Further, the material of the magnetic field guide head is a conductor; the magnetic field guide head includes a plurality of communicating portions and a plurality of interfering portions; and the interfering portions are each connected to the respective adjacent communicating portion sequentially along a communicating direction, and the borders of the plurality of interfering portions gradually converge along the communicating direction.

Further, the magnetic field guide device also includes a carrier, and the carrier is connected to the magnetic field guide head and extendable along the communicating direction of the interfering portions.

Optionally, the plurality of interfering portions of the magnetic field guide device are located on different planes respectively.

Further, the interfering portion located at one end of the magnetic field guide head is connected to the carrier, and the other end of the magnetic field guide head is far away from the carrier.

Optionally, the plurality of interfering portions and the plurality of communicating portions of the magnetic field guide device are located on the same plane.

Further, the plurality of interfering portions and the plurality of communicating portions are all connected to the carrier.

Further, the magnetic field guide head is of an elastic material, and a converging direction of the magnetic field guide head can be changed reciprocally under an external force condition.

Still further, at least one end of the magnetic field guide head is connected to a pulse current device.

The present disclosure relates to a method for changing a magnetic field state, that is, the above magnetic field guide device is placed in proximity or connected to a target object that requires a change in a magnetic field state.

The present disclosure has the following advantages:

(1) The present disclosure employs a simple design to direct an induced magnetic field passing through the magnetic field guide device from a minimum-border interfering portion end to a maximum-border interfering portion end. When the minimum-border interfering portion end is in proximity or connected to the target object, the effect of guiding the magnetic field of the target object along a direction from a convergence end to a diffusion end of the magnetic field guide device is achieved; and when the maximum-border interfering portion end is in proximity or connected to the target object, the effect of guiding the magnetic field of the target object along the direction from the convergence end to the diffusion end of the magnetic field guide device is achieved.

(2) If a plurality of magnetic field guide devices are in proximity or connected to the target object and maximum-border interfering portions of the plurality of magnetic field guide devices are directed to the same diction or the same position, a strong effect of converging a stray magnetic field of the target object is achieved, and even a focused magnetic field or a collective magnetic field is formed, thus increasing the possibility of effective use of an ordered magnetic field.

(3) When the minimum-border interfering portion end of the magnetic field guide device of the present disclosure is in proximity or connected to the target object, due to the directional characteristic of the magnetic field from the convergence end to the diffusion end, an ordered flow of molecules is formed within the target object, thereby promoting export of heat in the target object along the magnetic field guide device of the present disclosure. When the maximum-border interfering portion end of the magnetic field guide device is in proximity or connected to the target object, since the directional characteristic of the magnetic field from the convergence end to the diffusion end is directed to the target object, the molecular motion within the target object becomes more active and stray, thus promoting a trend of increased heat in the target object.

(4) By changing the shape of the magnetic field guide device of the present disclosure, that is, positions of the interfering portions at both ends of the magnetic field guide head are constantly exchanged, the magnetic field passing through the magnetic field guide device can be directed to completely opposite directions, thus forming a reciprocating magnetic field having a frequency in the target object.

(5) By fixing one end of the magnetic field guide device of the present disclosure while generating elastic vibration at the other end, a varying magnetic field having an intensity can be induced, and therefore, when in proximity or connected to the target object, the magnetic field guide device can impose a relatively active impact to the target object.

(6) By connecting both ends of the magnetic field guide device to a pulse current device, the magnetic field guide device can generate an intermittent directional pulse magnetic field, and therefore, when in proximity or connected to the target object, the magnetic field guide device can impose a relatively active impact to the target object.

(7) By connecting the interfering portion at one end of the magnetic field guide device to a pulse current circuit, the guide strength of the magnetic field guide device can be increased or suppressed by an intermittent current.

BRIEF DESCRIPTION OF THE DRAWINGS

FIGS. 7 and 8 are reference diagrams of the second embodiment of the present disclosure during use, wherein FIG. 8 is an enlarged diagram of a portion represented by a circle in FIG. 7.

DETAILED DESCRIPTION

The technical means employed by the present disclosure to achieve the intended invention purpose is set forth below, in conjunction with the drawings and preferred embodiments of the present disclosure.

Figure 1:
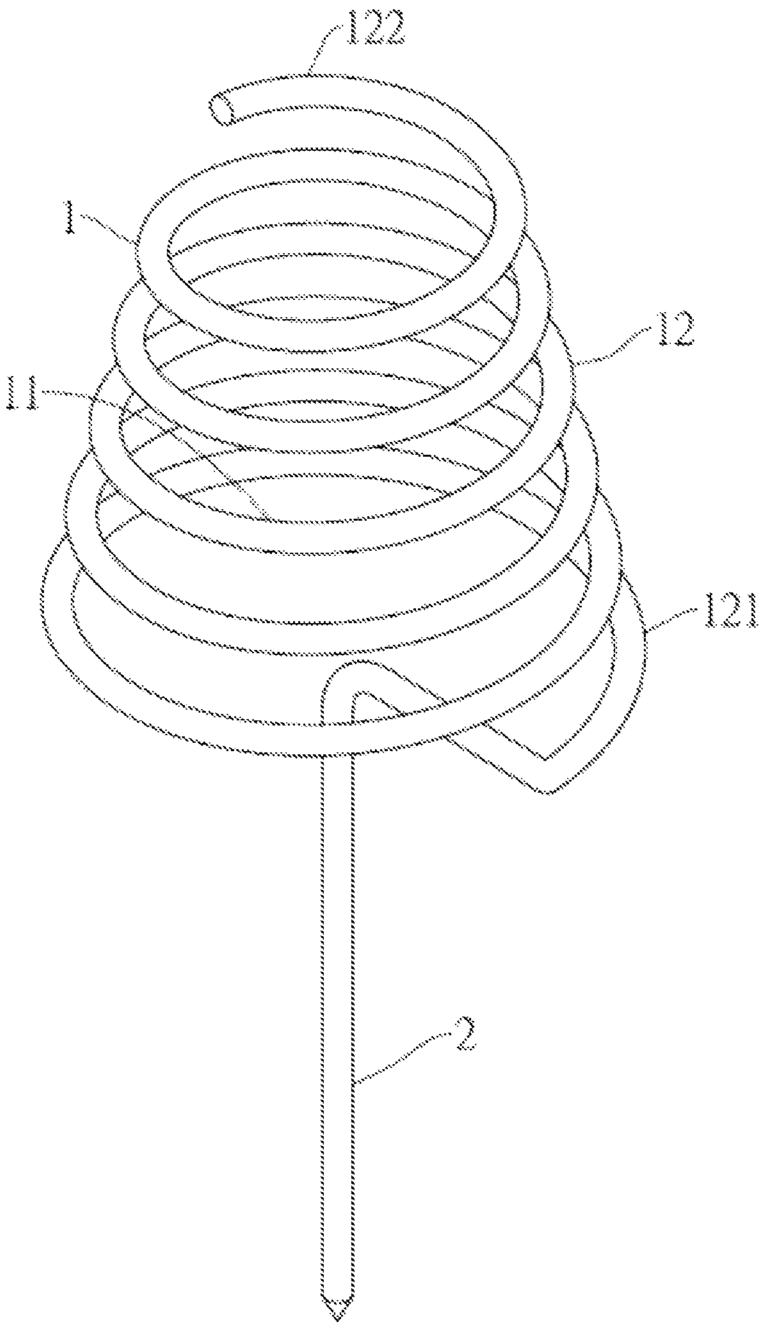
FIG. 1 is a stereoscopic diagram of a first embodiment of the present disclosure.

As shown in FIG. 1, the present disclosure discloses a magnetic field guide device, which includes a magnetic field guide head 1 and a carrier 2. The material of the magnetic field guide head 1 is a metal conductor. The magnetic field guide head 1 includes a plurality of communicating portions 11 and a plurality of interfering portions 12. All the interfering portions 12 are sequentially connected through the plurality of communicating portions 11 along a communicating direction, and the borders of the plurality of interfering portions 12 gradually converge along the communicating direction. The carrier 2 is connected to the magnetic field guide head 1, and is extendable along the communicating direction of the interfering portions 12.

Specifically, a processing technique of the magnetic field guide head is not limited in the present disclosure. In specific embodiments of the present disclosure, the magnetic field guide head 1 is integrally formed, mainly to save process flows. A sectional shape of the interfering portions 12 may be various shapes such as a triangle, a square, and a circle, and the present disclosure does not specify the sectional shape. The present disclosure also does not specify a connection mode and position of the carrier 2 and the magnetic field guide head 1. Any case where the magnetic field guide head 1 can be connected to a magnetic field of a target object or the magnetic field guide head 1 can be fixed in a magnetic field of a target object falls within the protection scope of the present disclosure. The material of the carrier 2 can be selected as needed, and is not limited in the present disclosure.

The magnetic field guide device of the present disclosure needs to be used in combination with the target object. When a convergence end or a diffusion end of the magnetic field guide device is respectively in proximity or connected to the target object, different effects are imposed to the magnetic field of the target object. When a magnetic field guide device with a static magnetic field is in proximity or connected to the target object, an adjustment effect may be imposed to the target object by relying on a change in the magnetic field of the target object, and such action mode is relatively passive. When a magnetic field guide device with a dynamic magnetic field is in proximity or connected to the target object, an adjustment effect may be imposed to the target object without relying on a change in the magnetic field of the target object, and such action mode is relatively active.

Figure 2:
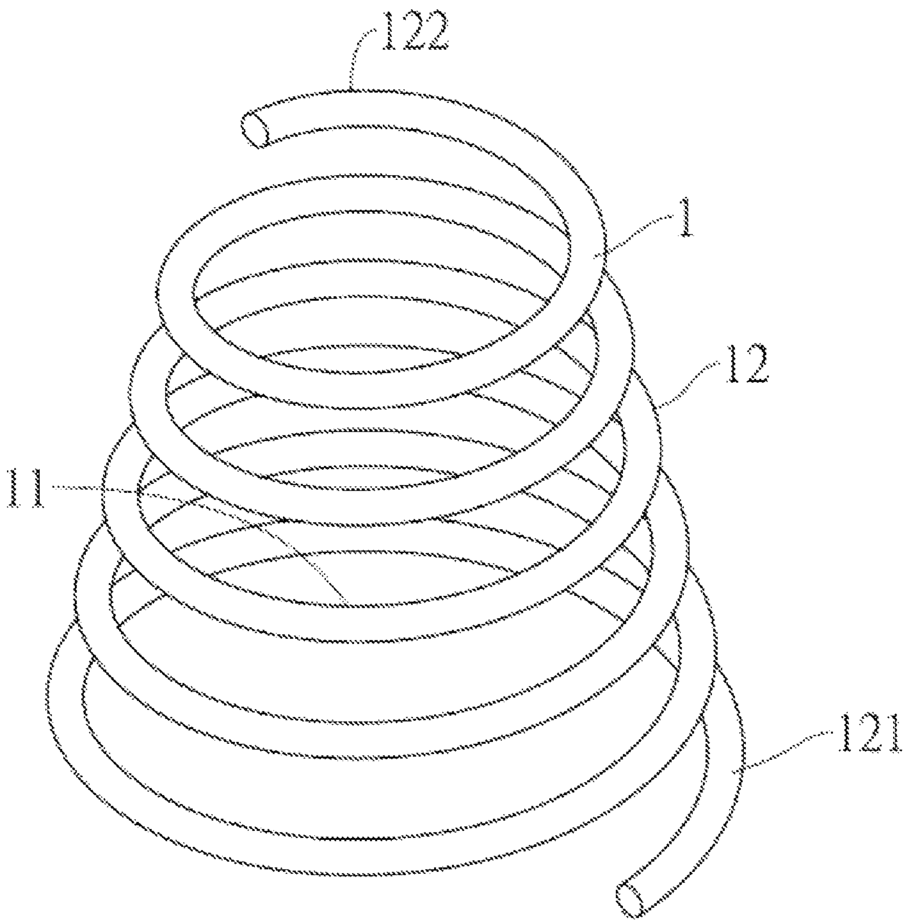
FIG. 2 is a stereoscopic diagram of a magnetic field guide head in the first embodiment.

As shown in FIGS. 1 and 2, during use of the magnetic field guide device in the present disclosure, the magnetic field guide head 1 is placed in a target magnetic field by means of the carrier 2. A magnetic field flow space provided by a minimum-border interfering portion 122 is small, and as the border of the interfering portions gradually expands, the magnetic field flow space also gradually increases, thus directing an induced magnetic field passing through the magnetic field guide device from a minimum-border interfering portion 122 end to a maximum-border interfering portion 121 end. When the minimum-border interfering portion 122 of the magnetic field guide device is in proximity or connected to the target object, the effect of guiding the magnetic field of the target object out of the target object along a direction from the convergence end to the diffusion end of the magnetic field guide device is achieved; and when the maximum-border interfering portion 121 of the magnetic field guide device is in proximity or connected to the target object, the effect of guiding the magnetic field of the target object into the target object along the direction from the convergence end to the diffusion end of the magnetic field guide device is achieved.

In another aspect, when the minimum-border interfering portion 122 of the magnetic field guide device of the present disclosure is in proximity or connected to the target object, due to the directional characteristic of the magnetic field from the convergence end to the diffusion end, an ordered flow of molecules is formed within the target object, thereby promoting export and transfer of heat in the target object along the magnetic field guide device of the present disclosure. When the maximum-border interfering portion 121 is in proximity or connected to the target object, since the directional characteristic of the magnetic field from the convergence end to the diffusion end is directed to the target object, the molecular motion within the target object becomes more active and stray, thus promoting the trend of increased heat in the target object.

The technical content of the present disclosure is further described below in detail in conjunction with specific embodiments.

Embodiment 1

In this embodiment, as shown in FIGS. 1 and 2, the magnetic field guide head 1 is integrally formed with a material of stainless steel. The plurality of communicating portions 11 and the plurality of interfering portions 12 together constitute an upward conical spiral structure. Spiral radii of the plurality of interfering portions 12 gradually decrease, achieving the effect of converging the interfering portions 12. All the interfering portions 12 are located on different planes. The carrier 2 is a stainless steel needle, which, in this embodiment, is connected to the maximum-border interfering portion 121 and is far away from the minimum-border interfering portion 122. During use, the carrier 2 pierces a human body acupoint like an acupuncture needle, and the magnetic field guide head 1 is used to guide a weak biological field at the human body acupoint to the maximum-border interfering portion 121. That is, the biological field is guided in a direction directed to the human body, thereby achieving the effect of back vibration on the acupoint. Optionally, in this embodiment, the carrier 2 can also be connected to the minimum-border interfering portion 122 and far away from the maximum-border interfering portion 121. After the carrier 2 pierces the human body, the magnetic field guide head 1 may be used to guide the weak biological field at the human body acupoint to the maximum-border interfering portion 121, achieving the effect of directionally guiding the biological field out of the human body.

In this embodiment, the carrier 2 can also be an acupuncture needle in the prior art, and can be connected to the maximum-border interfering portion 121 or the minimum-border interfering portion 122 of the magnetic field guide head 1 in FIG. 2 by means of buckle connection, clamp connection, or sleeve connection. A connection mode is not particularly limited in this embodiment, and any case where the magnetic field guide head 1 can be connected to the acupuncture needle falls within the protection scope of this embodiment.

Figure 3:
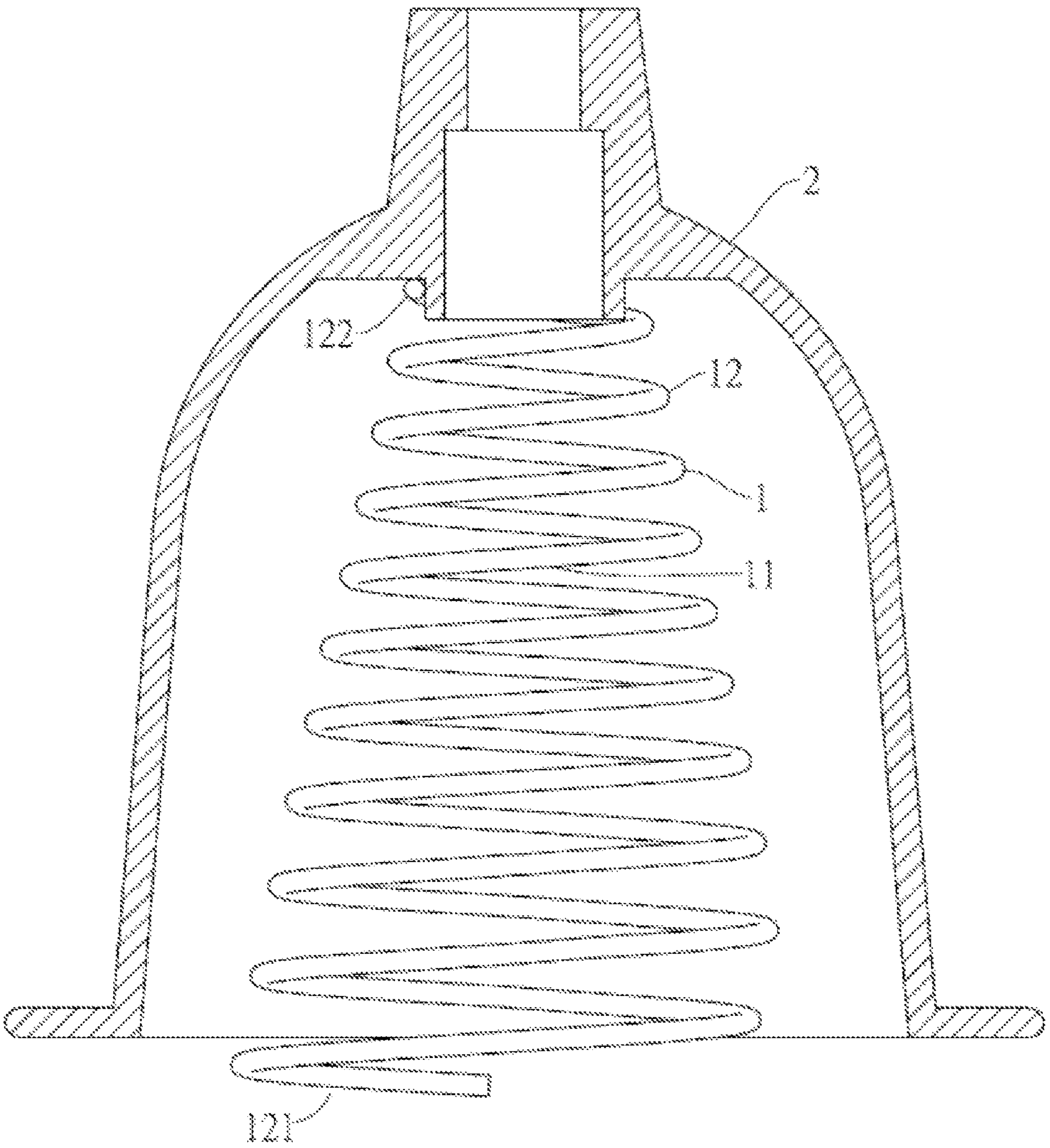
FIGS. 3 and 4 show other forms of a carrier in the first embodiment.

As shown in FIG. 3, the carrier 2 can be a cupping cup with an internal "U"-shaped top end connected to the minimum-border interfering portion 122 of the magnetic field guide head 1. The maximum-border interfering portion 121 is far away from the internal "U"-shaped top end of the cupping cup 2 and protrudes from a "U"-shaped bottom opening of the cupping cup 2. During use, the cupping cup 2 is attached to the human skin, and the maximum-border interfering portion 121 is in contact with the human skin to achieve the effect of guiding the biological field in a direction directed to the human body.

Figure 4:
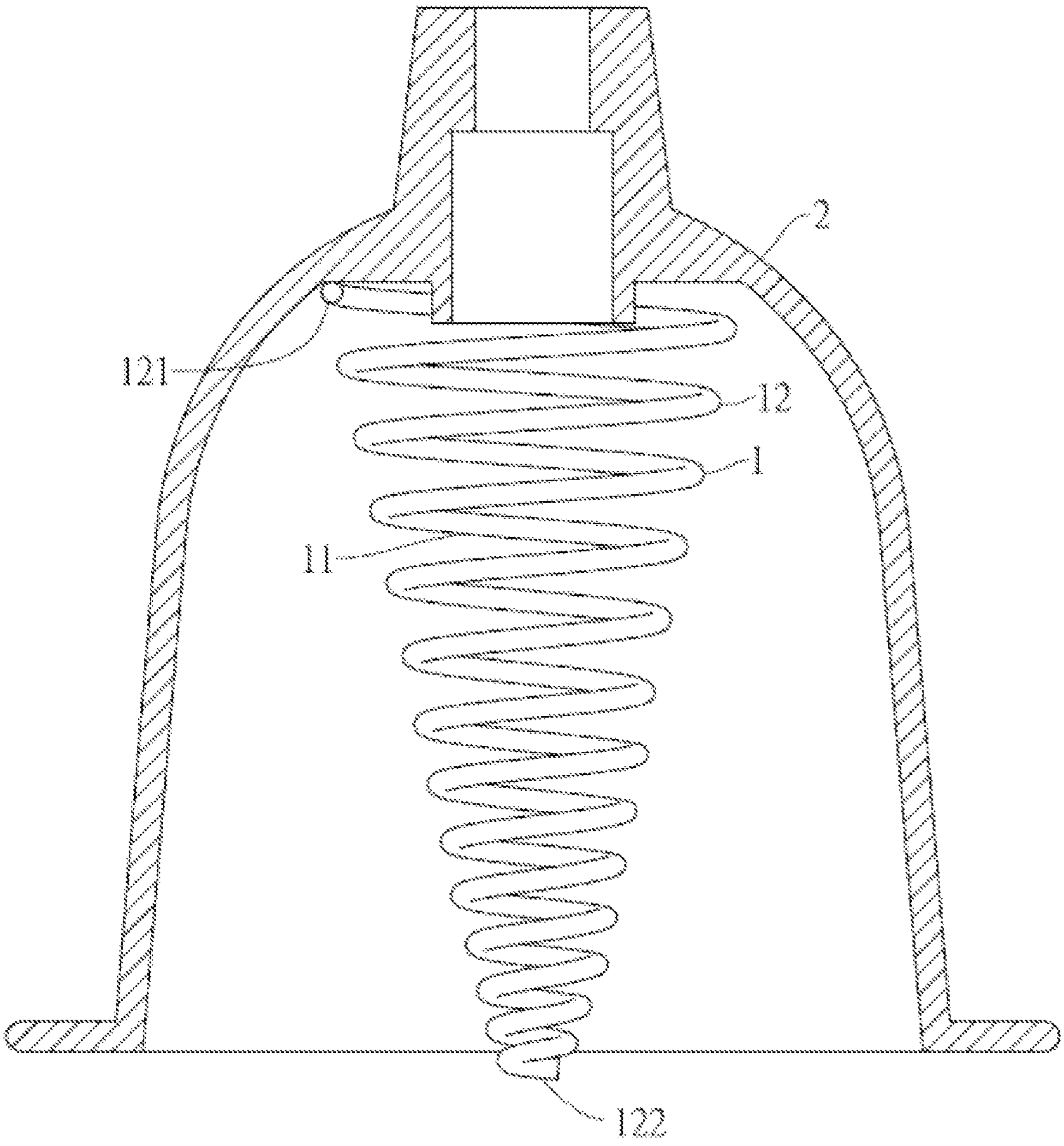

As shown in FIG. 4, the maximum-border interfering portion 121 of the magnetic field guide head 1 is connected to the internal "U"-shaped top end of the cupping cup 2, and the minimum-border interfering portion 122 is in contact with the human skin, achieving the effect of directionally guiding the biological field out of the human body.

In Embodiment 1, the connection mode and connection position of the carrier 2 can be adjusted according to requirements and a required magnetic field direction, and are not particularly limited in this embodiment.

Embodiment 2

Figure 5:
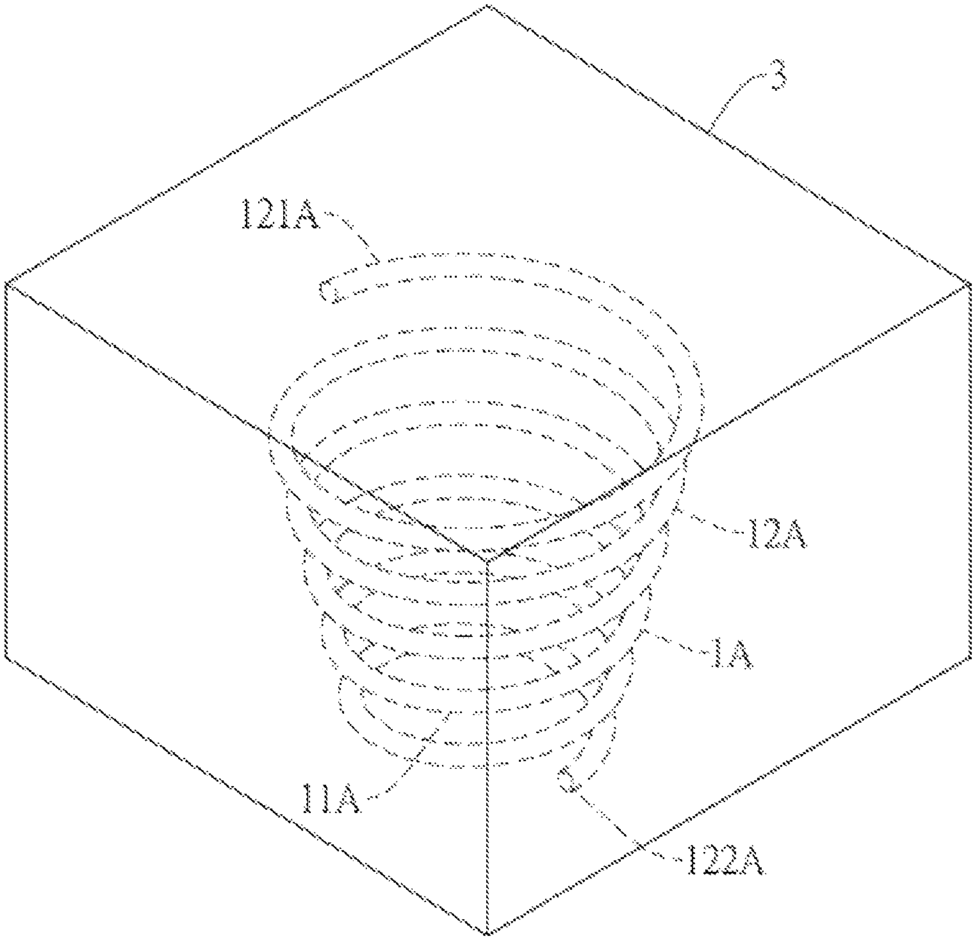
FIG. 5 is a reference diagram of a magnetic field guide head in a second embodiment of the present disclosure.
Figure 6:
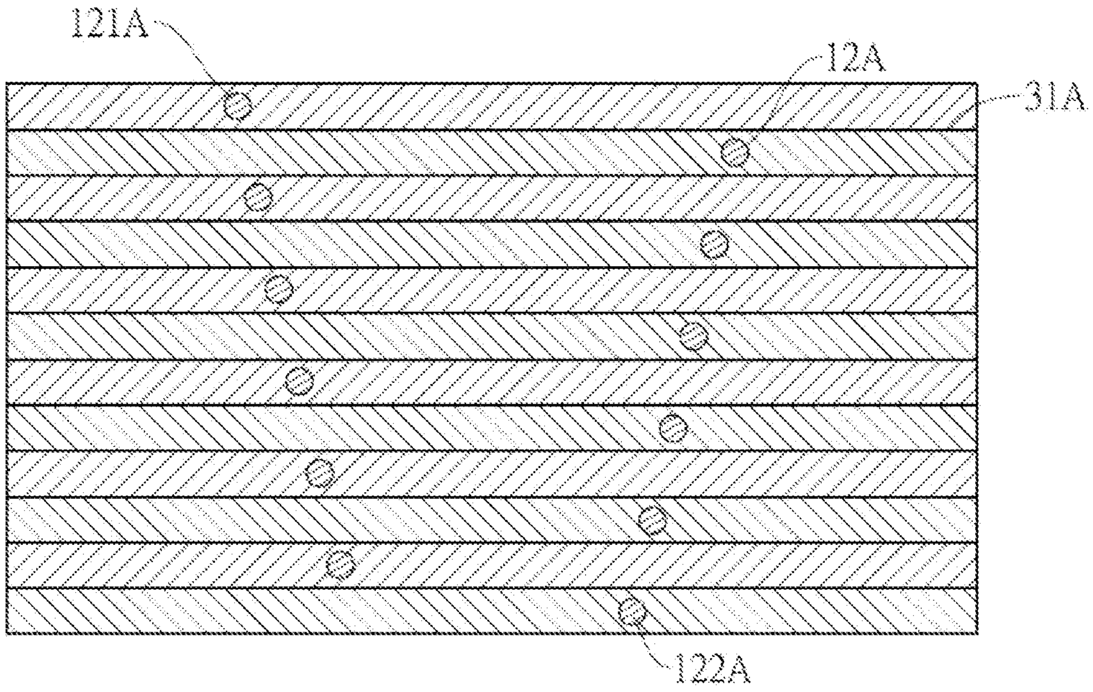
FIG. 6 is a front sectional diagram of FIG. 5.
Figure 8:
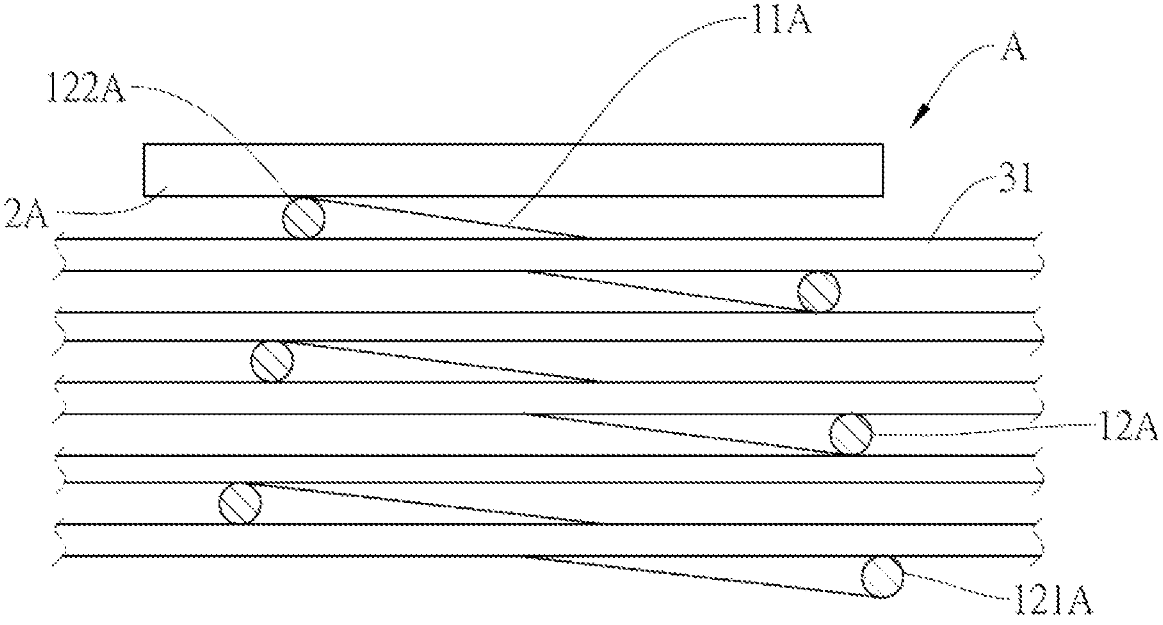

As shown in FIGS. 5 and 8, in this embodiment, a magnetic field guide head 1A of a magnetic field guide device A is the same as that in Embodiment 1. A carrier 2A is a heat-conducting cylindrical structure, and is connected to a minimum-border interfering portion 122A and far away from a maximum-border interfering portion 121A. The magnetic field guide head 1A is placed in an insulating material 3 during use. As shown in FIGS. 6 and 8, an insulating layer 31 is disposed between adjacent interfering portions 12A, and a communicating portion 11A passes through the insulating layer 31 to communicate two adjacent interfering portions 12A. Due to such design, a spatial structure in which the borders of the interfering portions 12A converge along a specific direction can be maintained even when the interfering portions 12A of the magnetic field guide head 1A are compressed into a planar state. In this way, when the carrier 2A is in contact with a heat source, heat export along a direction opposite to a convergence direction of the interfering portions 12A can be promoted.

Figure 7:
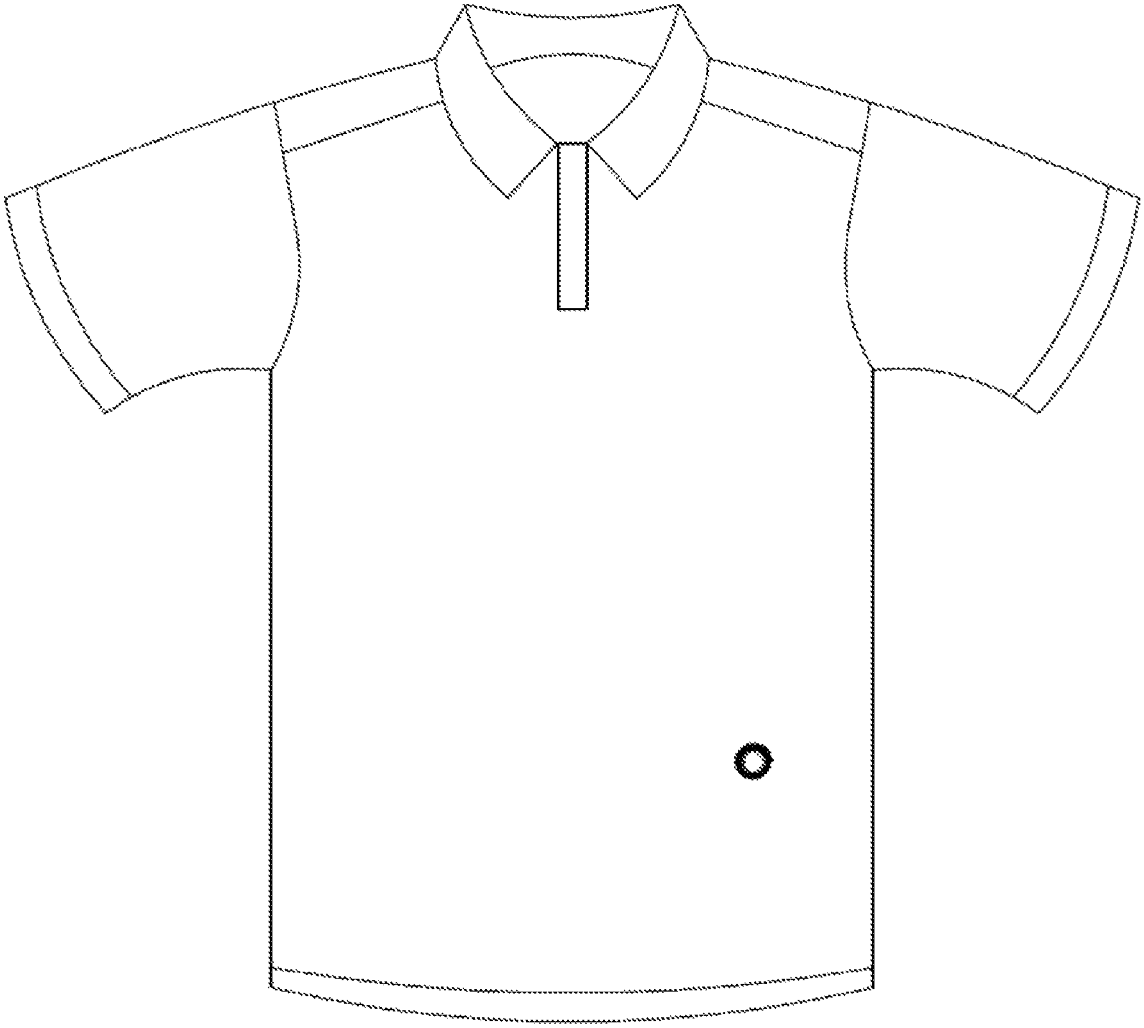

FIGS. 7 and 8 show an application of this embodiment in a clothing heat dissipation technology. A plurality of magnetic field guide devices A are placed in a clothing fabric, and the carrier 2A is in contact with the human skin. The material of the insulating layer 31 is a material that constitutes clothing, such as cotton or linen, which is not limited herein. During wearing of the clothing, the carrier 2A transfers heat generated by the human body to the magnetic field guide head 1A, and a directional heat conduction function of the magnetic field guide head 1A promotes transfer of the heat out of the body. By placing the device of this embodiment in an insulating layered structure and connecting the device to a heat source such as a chip or a circuit board by means of the carrier 2A, heat of the layered structure such as the chip or the circuit board can be dissipated.

In this embodiment, if the maximum-border interfering portion 121A is connected to the carrier 2A and the device is placed in a clothing interlining with the carrier 2A in contact with the human body, a magnetic field having a directional characteristic from a convergence end to a diffusion end is directed to the human body, and a molecular motion within the human body becomes more active and stray, thus implementing the function of promoting heat increasing within the human body and achieving the purpose of using the clothing to heat the human body.

Embodiment 3

Figure 9:
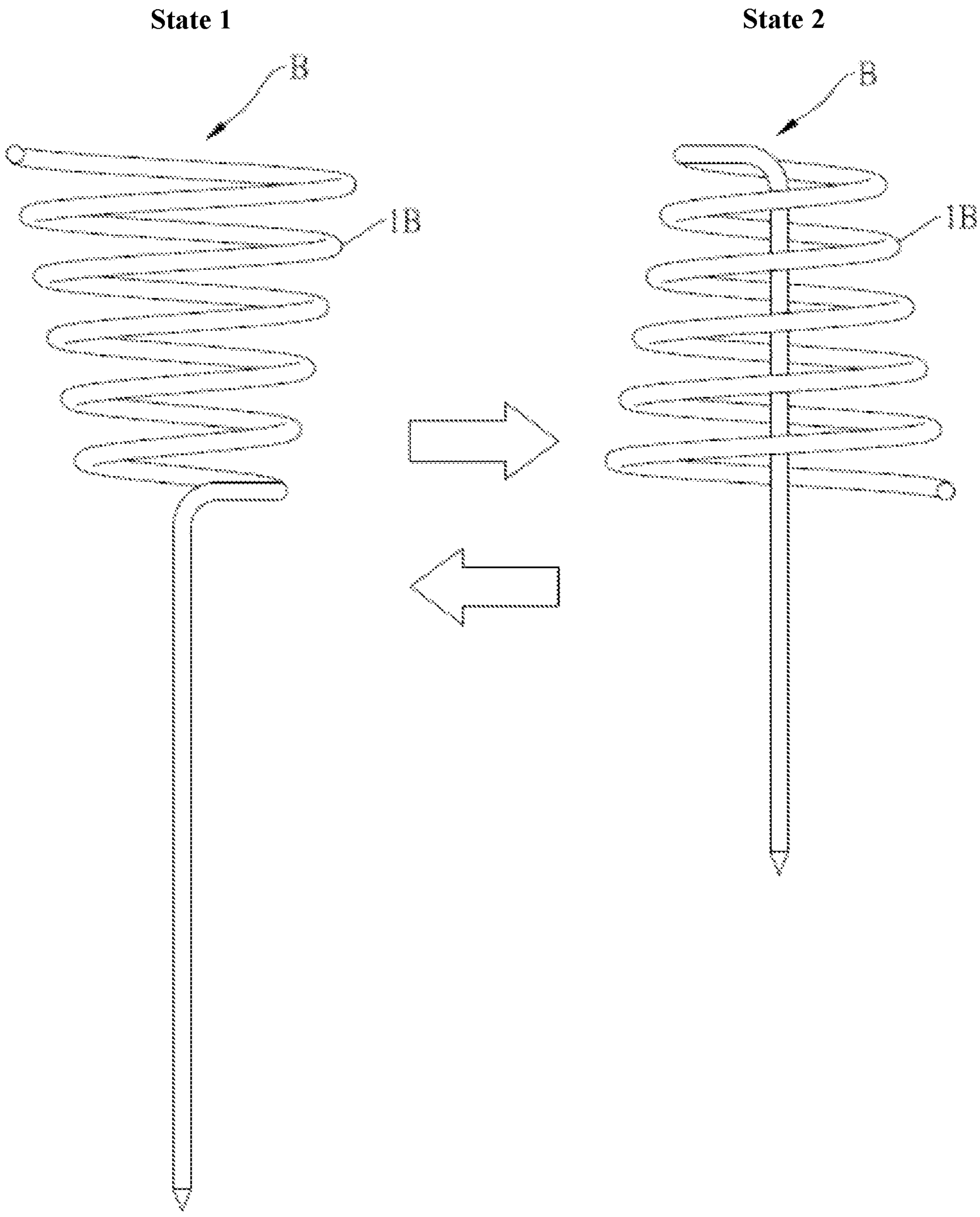
FIG. 9 is a state change diagram of a third embodiment of a magnetic field guide device during use.

As shown in FIG. 9, a magnetic field guide device B in this embodiment is similar to the magnetic field guide device in Embodiment 1, except that a magnetic field guide head 1B in this embodiment is made of an elastic material. Under the action of an external force, the magnetic field guide head 1B changes from a state 1 to a state 2 and reciprocally oscillates between the state 1 and the state 2. A magnetic field passing through the magnetic field guide device B can be directed to completely opposite directions, thus forming a reciprocating magnetic field having a frequency in a target object.

Embodiment 4

Figure 10:
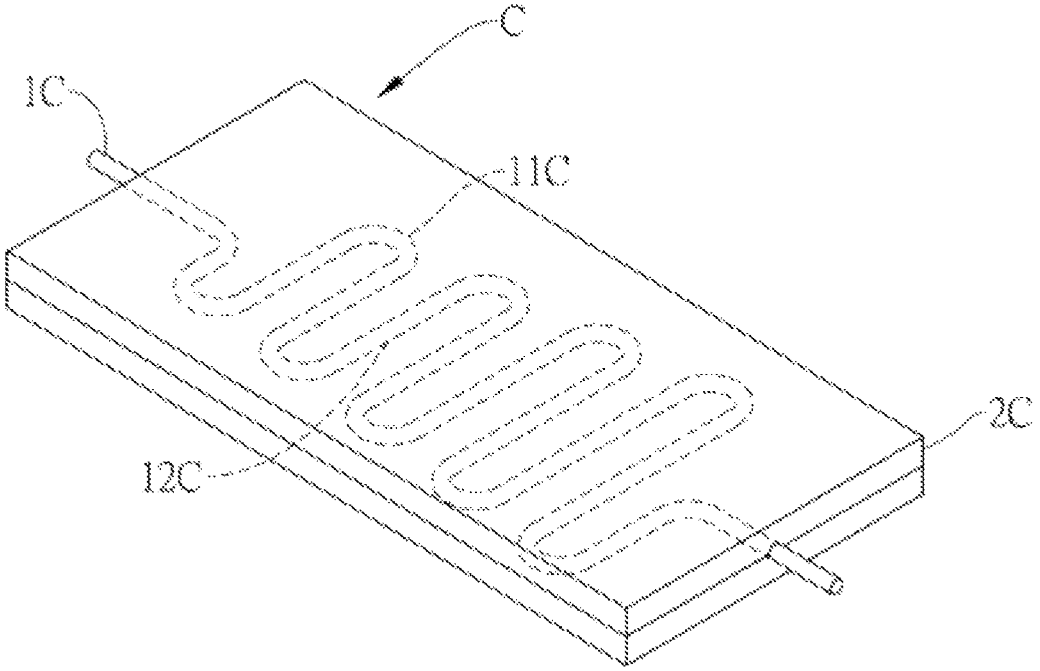
FIG. 10 is a stereoscopic diagram of a fourth embodiment of the present disclosure.

In this embodiment, the material of a magnetic field guide head 1C of a magnetic field guide device C is metal copper. As shown in FIG. 10, the magnetic field guide head 1C is integrally formed, wherein a plurality of communicating portions 11C and a plurality of interfering portions 12C form a plurality of "S" shapes with gradually converging borders and connected end-to-end, and the plurality of communicating portions 11C and the plurality of interfering portions 12C are located on the same plane. A carrier is an insulating patch 2C, and the plurality of communicating portions 11C and the plurality of interfering portions 12C are all attached to the patch 2C. During use, the patch 2C is attached between two points on the human skin as needed, so as to guide a weak biological field between the two points along a direction opposite to a convergence direction of the magnetic field guide head 1C, thus achieving some therapeutic or health-care purposes.

Figure 11:
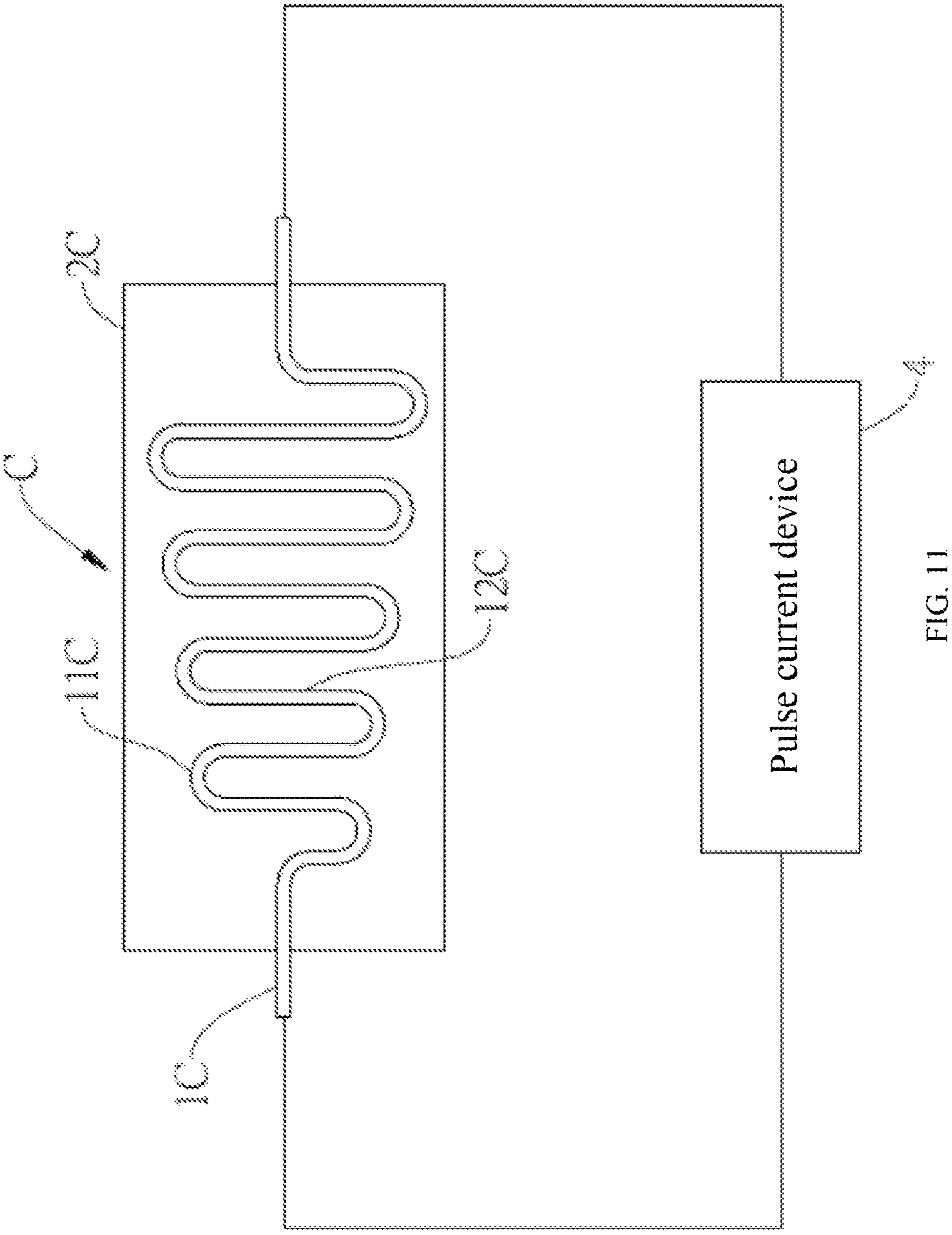
FIG. 11 is a reference diagram of the fourth embodiment of the magnetic field guide device in a state of being connected to a pulse device.

As shown in FIG. 11, both ends of the magnetic field guide device C in this embodiment are connected to a pulse current device 4, such that the magnetic field guide head 1C actively generates a pulse current, thereby actively generating an intermittent pulse magnetic field. When the patch 2C is attached between the two points on the human skin, the static biological field between the two points on the human skin can be guided along the direction opposite to the convergence direction of the magnetic field guide head 1C, thus achieving a relatively active impact.

In Embodiment 4, in addition to actively connecting the magnetic field guide device to the pulse current device, a constantly varying magnetic field can be directionally guided into a site of the human body by connecting both ends of the magnetic field guide device to an external constantly varying magnetic field varying device, such as a rotating or swinging magnetic field varying device, thereby actively affecting a biological field on the human body.

The present disclosure has the following advantages:

(1) The present disclosure employs a simple design to direct an induced magnetic field passing through the magnetic field guide device from a minimum-border interfering portion end to a maximum-border interfering portion end. When the minimum-border interfering portion end is in proximity or connected to the target object, the effect of guiding the magnetic field of the target object along a direction from a convergence end to a diffusion end of the magnetic field guide device is achieved; and when the maximum-border interfering portion end is in proximity or connected to the target object, the effect of guiding the magnetic field of the target object along the direction from the convergence end to the diffusion end of the magnetic field guide device is achieved.

(2) If a plurality of magnetic field guide devices are in proximity or connected to the target object and maximum-border interfering portions of the plurality of magnetic field guide devices are directed to the same diction or the same position, a strong effect of converging a stray magnetic field of the target object is achieved, and even a focused magnetic field or a collective magnetic field is formed, thus increasing the possibility of effective use of an ordered magnetic field.

(3) When the minimum-border interfering portion end of the magnetic field guide device of the present disclosure is in proximity or connected to the target object, due to the directional characteristic of the magnetic field from the convergence end to the diffusion end, an ordered flow of molecules is formed within the target object, thereby promoting export of heat in the target object along the magnetic field guide device of the present disclosure. When the maximum-border interfering portion end of the magnetic field guide device is in proximity or connected to the target object, since the directional characteristic of the magnetic field from the convergence end to the diffusion end is directed to the target object, the molecular motion within the target object becomes more active and stray, thus promoting a trend of increased heat in the target object.

(4) By changing the shape of the magnetic field guide device of the present disclosure, that is, positions of the interfering portions at both ends of the magnetic field guide head are constantly exchanged, the magnetic field passing through the magnetic field guide device can be directed to completely opposite directions, thus forming a reciprocating magnetic field having a frequency in the target object.

(5) By fixing one end of the magnetic field guide device of the present disclosure while generating elastic vibration at the other end, a varying magnetic field having an intensity can be induced, and therefore, when in proximity or connected to the target object, the magnetic field guide device can impose a relatively active impact to the target object.

(6) By connecting both ends of the magnetic field guide device to a pulse current device, the magnetic field guide device can generate an intermittent directional pulse magnetic field, and therefore, when in proximity or connected to the target object, the magnetic field guide device can impose a relatively active impact to the target object.

(7) By connecting the interfering portion at one end of the magnetic field guide device to a pulse current circuit, the guide strength of the magnetic field guide device can be increased or suppressed by an intermittent current.

The above descriptions are only preferred embodiments of the present disclosure, and do not impose any formal limitations on the present disclosure. Although the present disclosure is disclosed as above with the preferred embodiments, these embodiments are not intended to limit the present disclosure. Those skilled in the art can make some changes or modifications to the above disclosed technical content into equivalent embodiments with equivalent variations, without departing from the scope of the technical solution of the present disclosure. In addition, after research, the inventor finds that the method and the device involved in the present disclosure have the same effect mode at a more microscopic quantum level in similar application methods. Therefore, any simple amendments, equivalent changes, and modifications made to the above embodiments based on the technical essence of the present disclosure, without departing from the content of the technical solution of the present disclosure, still fall within the scope of the technical solution of the present disclosure.

What is claimed is:

1. A magnetic field guide device, comprising a wedge-shaped magnetic field guide head, wherein the magnetic field guide head is integrally formed, wherein a border of the magnetic field guide head gradually converges along a specific direction;

wherein a material of the magnetic field guide head is a conductor; the magnetic field guide head comprises a plurality of communicating portions and a plurality of interfering portions; wherein the plurality of interfering portions are each connected to the respective adjacent communicating portion sequentially along a communicating direction, and wherein borders of the plurality of interfering portions gradually converge along the communicating direction; wherein the plurality of communicating portions and the plurality of interfering portions jointly constitute an upward conical spiral structure;

wherein the magnetic field guide device further comprises a carrier connected to the magnetic field guide head and extendable along the communicating direction of the plurality of interfering portions; wherein the carrier is configured to place the magnetic field guide head in proximity to a target object;

wherein the magnetic field guide device is configured such that when a convergence end of the wedge-shaped magnetic field guide head is placed in proximity to or connected to the target object, the magnetic field guide device is operative to promote a magnetic field of the target object to be exported along a direction from the convergence end to a diffusion end of the magnetic field guide device, and promote transfer and export of heat from the target object along the magnetic field guide device;

or the magnetic field guide device is configured such that when the diffusion end of the wedge-shaped magnetic field guide head is placed in proximity to or connected to the target object, the magnetic field guide device is operative to promote the magnetic field of the target object to be imported or guided in along a direction from the convergence end to the diffusion end of the magnetic field guide device, and cause internal molecules of the target object to move more actively thereby promoting a trend of heat increase.

2. The magnetic field guide device of claim 1, wherein the plurality of interfering portions are respectively located on different planes.

3. The magnetic field guide device of claim 2, wherein the interfering portion located at one end of the magnetic field guide head is connected to the carrier, and the other end of the magnetic field guide head is far away from the carrier.

4. The magnetic field guide device of claim 1, wherein the carrier is a stainless steel needle, which is connected to a maximum-border interfering portion and is located relatively far away from a minimum-border interfering portion, wherein during use the carrier is configured to pierce a human body acupoint in the manner of an acupuncture needle, and the magnetic field guide head is configured to guide a weak biological field at the human body acupoint to the maximum-border interfering portion thereby achieving an effect of back vibration on the acupoint.

5. The magnetic field guide device of claim 1, wherein the carrier is a stainless steel needle, which is connected to a minimum-border interfering portion and is located relatively far away from a maximum-border interfering portion, wherein during use the carrier is configured to pierce a human body acupoint in the manner of an acupuncture needle, and the magnetic field guide head is configured to guide a weak biological field at the human body acupoint to the maximum-border interfering portion thereby achieving an effect of directionally guiding the biological field out of the human body.

6. The magnetic field guide device of claim 1, wherein the carrier is an acupuncture needle and is connected to a maximum-border interfering portion or a minimum-border interfering portion of the magnetic field guide head by means of a buckle connection, clamp connection, or sleeve connection.

7. The magnetic field guide device of claim 1, wherein the carrier is a cupping cup with an internal U-shaped top end connected to a minimum-border interfering portion of the magnetic field guide head, wherein a maximum-border interfering portion of the magnetic field guide head is located relatively far away from the internal U-shaped top end of the cupping cup and protrudes from a U-shaped bottom opening of the cupping cup; wherein during use the cupping cup is configured to be attached to human skin, and the maximum-border interfering portion is in contact with the human skin to achieve an effect of guiding a biological field in a direction directed to the human body.

8. The magnetic field guide device of claim 1, wherein the carrier is a cupping cup with an internal U-shaped top end connected to a maximum-border interfering portion of the magnetic field guide head, wherein a minimum-border interfering portion of the magnetic field guide head is located relatively far away from the internal U-shaped top end of the cupping cup and protrudes from a U-shaped bottom opening of the cupping cup; wherein during use the cupping cup is configured to be attached to human skin, and the minimum-border interfering portion is in contact with the human skin thereby achieving an effect of directionally guiding a biological field out of the human body.

* * * * *